United States Patent
Horikawa et al.

(10) Patent No.: US 7,161,888 B2
(45) Date of Patent: Jan. 9, 2007

(54) INFORMATION RECORDING DEVICE AND INFORMATION RECORDING METHOD

(75) Inventors: Kunihiko Horikawa, Saitama (JP); Shoji Taniguchi, Saitama (JP); Eiji Muramatsu, Saitama (JP); Akira Shirota, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/517,525

(22) PCT Filed: Apr. 2, 2003

(86) PCT No.: PCT/JP03/04233

§ 371 (c)(1),
(2), (4) Date: Aug. 15, 2005

(87) PCT Pub. No.: WO03/107332

PCT Pub. Date: Dec. 24, 2003

(65) Prior Publication Data

US 2006/0098547 A1    May 11, 2006

(30) Foreign Application Priority Data

Jun. 14, 2002    (JP) ............................ 2002-173609

(51) Int. Cl.
*G11B 7/00*    (2006.01)
*G11B 5/09*    (2006.01)

(52) U.S. Cl. ................. 369/59.11; 369/59.1; 369/47.5; 369/116

(58) Field of Classification Search .................... None
See application file for complete search history.

(56) References Cited

FOREIGN PATENT DOCUMENTS

| JP | 9-282660 | 10/1997 |
|----|----------|---------|
| JP | 10-91961 | 4/1998 |
| JP | 2001-110053 | 4/2001 |
| JP | 2001-176073 | 6/2001 |
| JP | 2001-274358 | 10/2001 |

*Primary Examiner*—Muhammad Edun
(74) *Attorney, Agent, or Firm*—Young & Thompson

(57) ABSTRACT

Based on a recording signal, a recording pulse signal, which includes a top pulse located at a front end portion and having a first magnitude, a last pulse located at a back end portion and having the first magnitude, and an intermediate bias portion located between the top pulse and the last pulse and having a second magnitude, is generated. Based on the recording pulse signal, a light source is controlled, and a laser pulse is irradiated on a recording medium. Recording marks corresponding to the recording signal are formed on the recording medium. In generating the recording pulse signal, when the recording medium is rotationally driven, a position of the top pulse is shifted ahead of a position of the top pulse when the recording medium is rotationally driven at the first rotation speed, when the recording medium is rotationally driven at the second control speed.

16 Claims, 14 Drawing Sheets

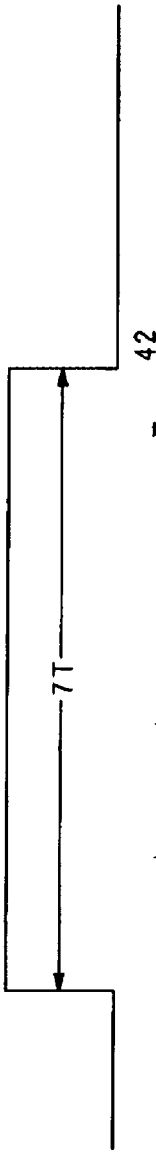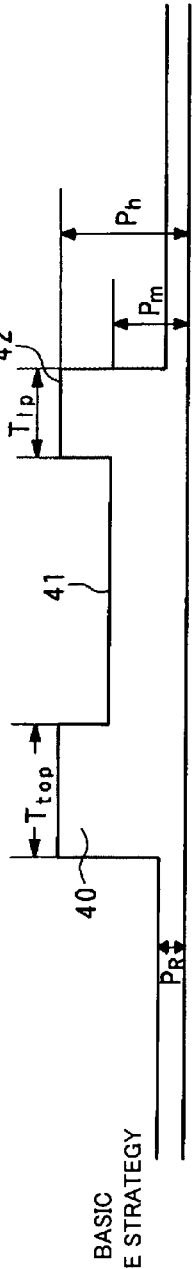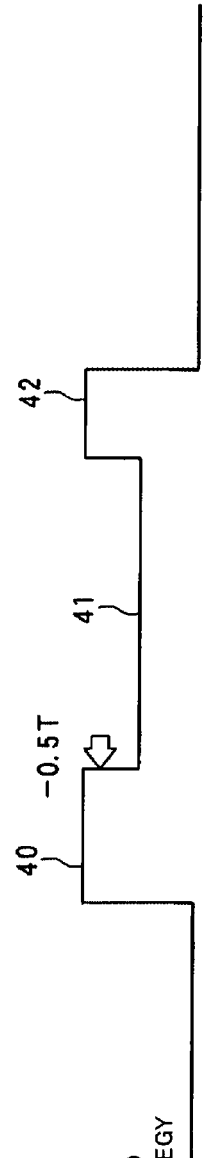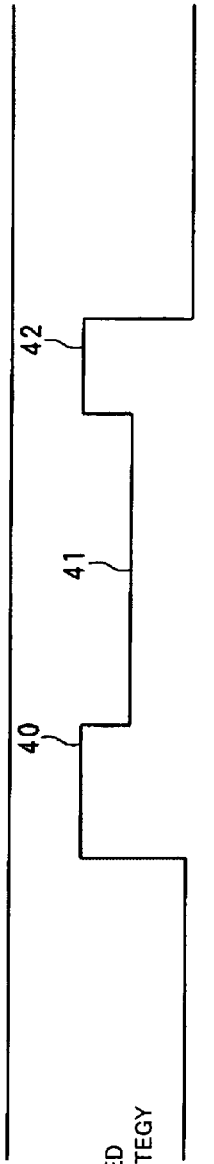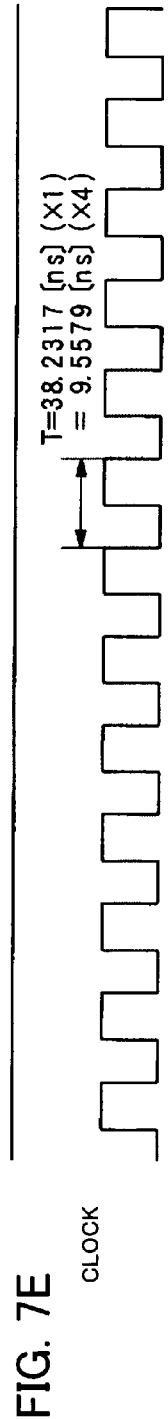
FIG. 7A RECORDING DATA
FIG. 7B BASIC WRITE STRATEGY
FIG. 7C IMPROVED WRITE STRATEGY
FIG. 7D IMPROVED WRITE STRATEGY
FIG. 7E CLOCK

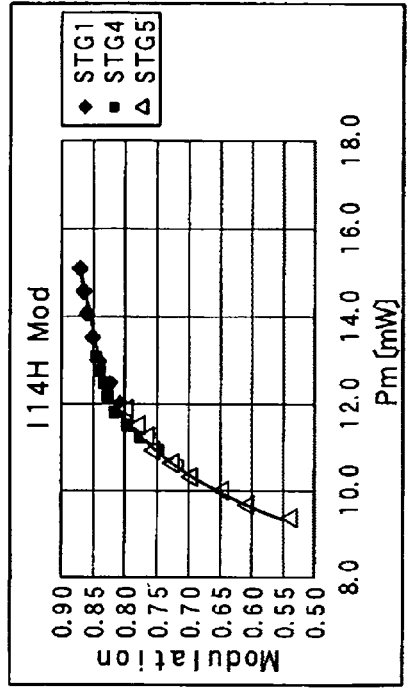
FIG. 9A <COMPARATIVE EXAMPLE>
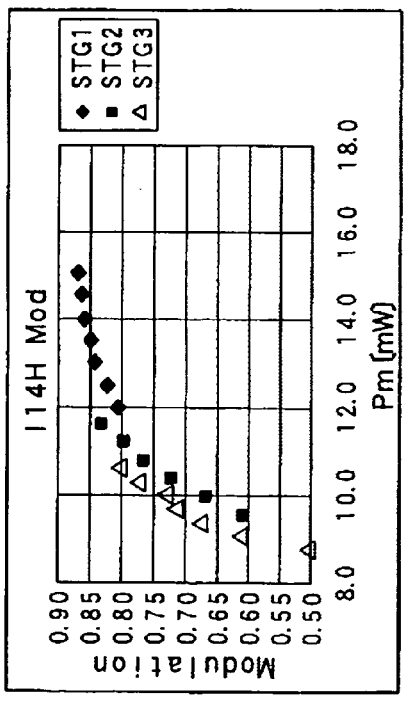
FIG. 9B <IMPROVED WRITE STRATEGY>
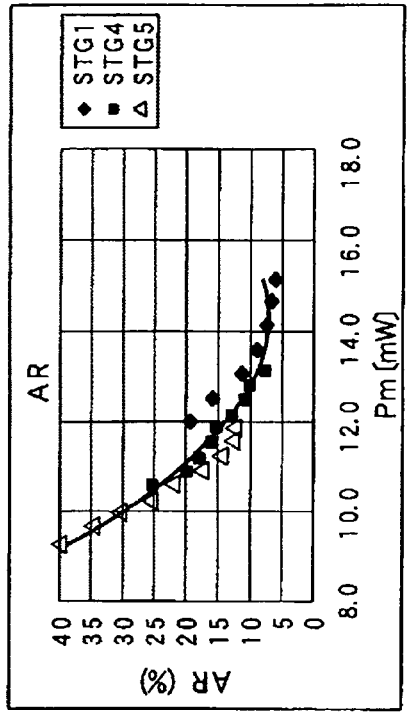
FIG. 9C <COMPARATIVE EXAMPLE>
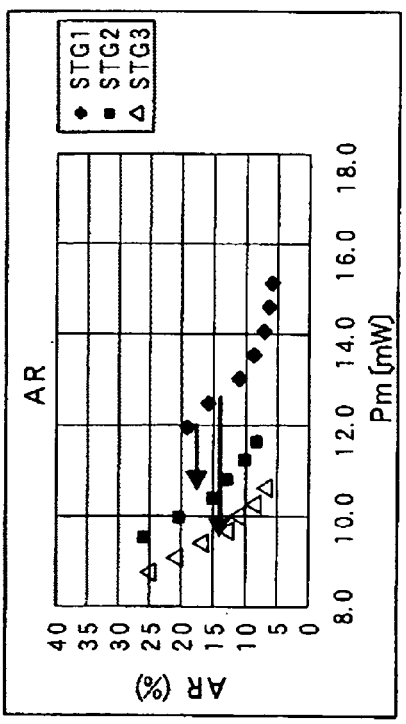
FIG. 9D <IMPROVED WRITE STRATEGY>

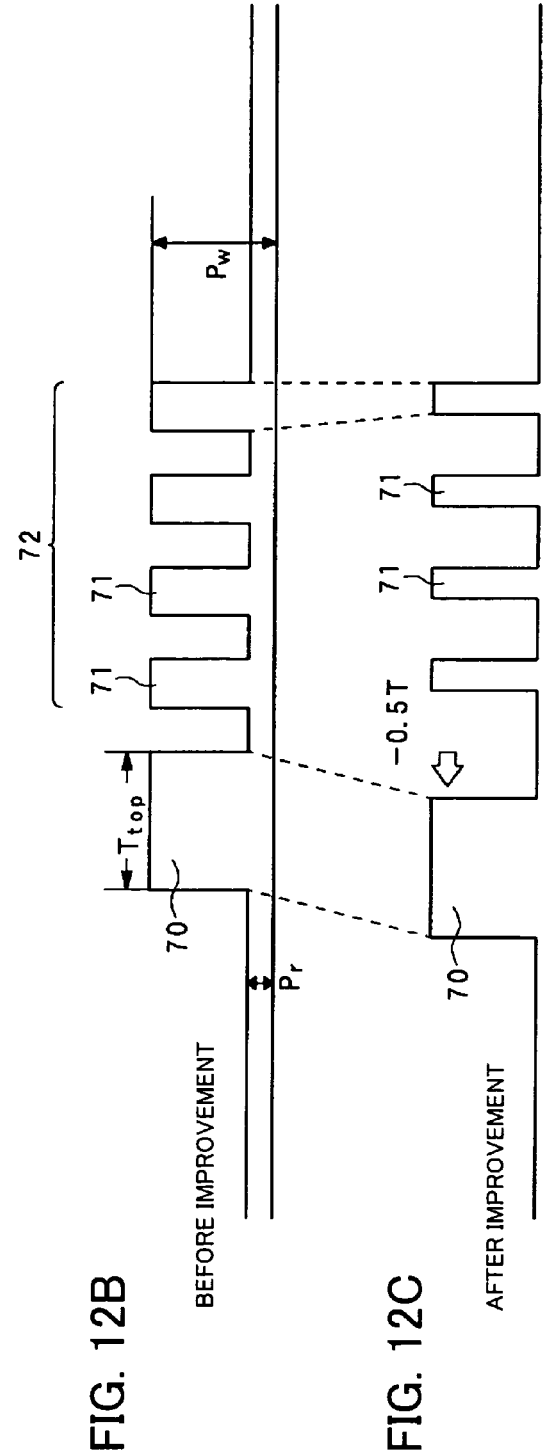
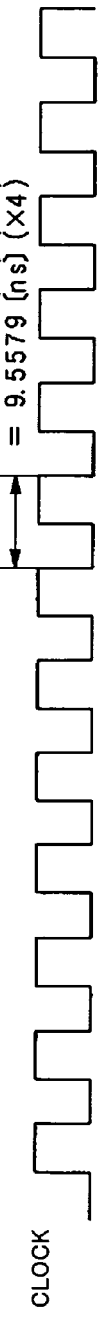
FIG. 12A RECORDING DATA
FIG. 12B BEFORE IMPROVEMENT
FIG. 12C AFTER IMPROVEMENT
FIG. 12D CLOCK

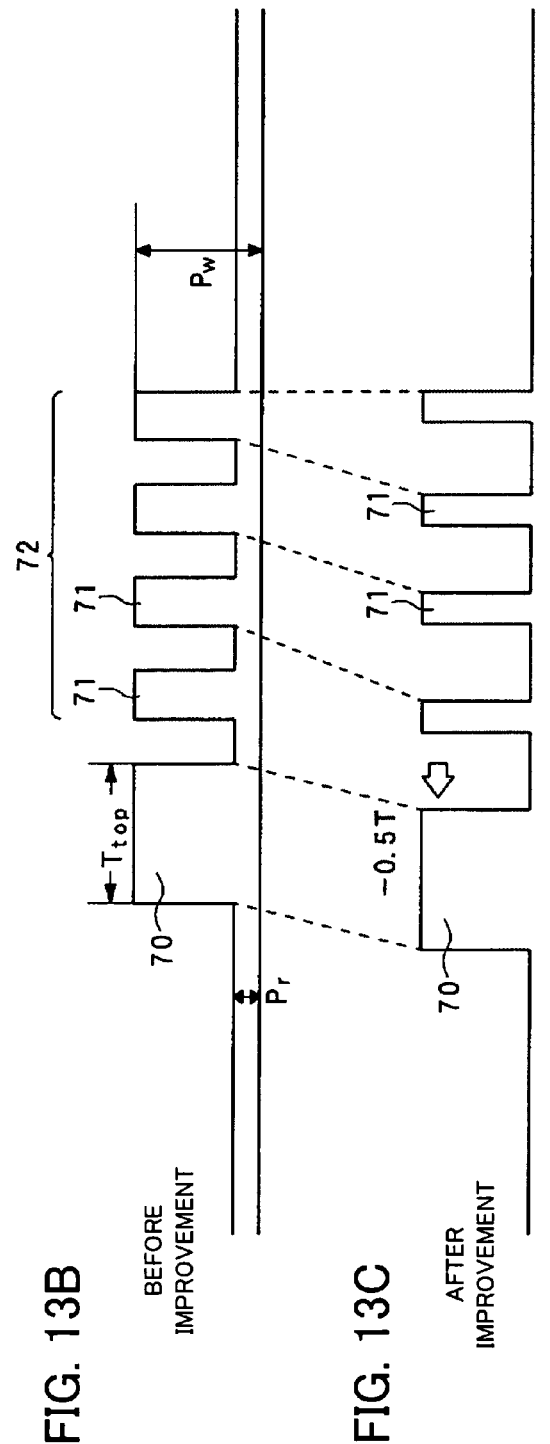
FIG. 13A RECORDING DATA
FIG. 13B BEFORE IMPROVEMENT
FIG. 13C AFTER IMPROVEMENT
FIG. 13D CLOCK

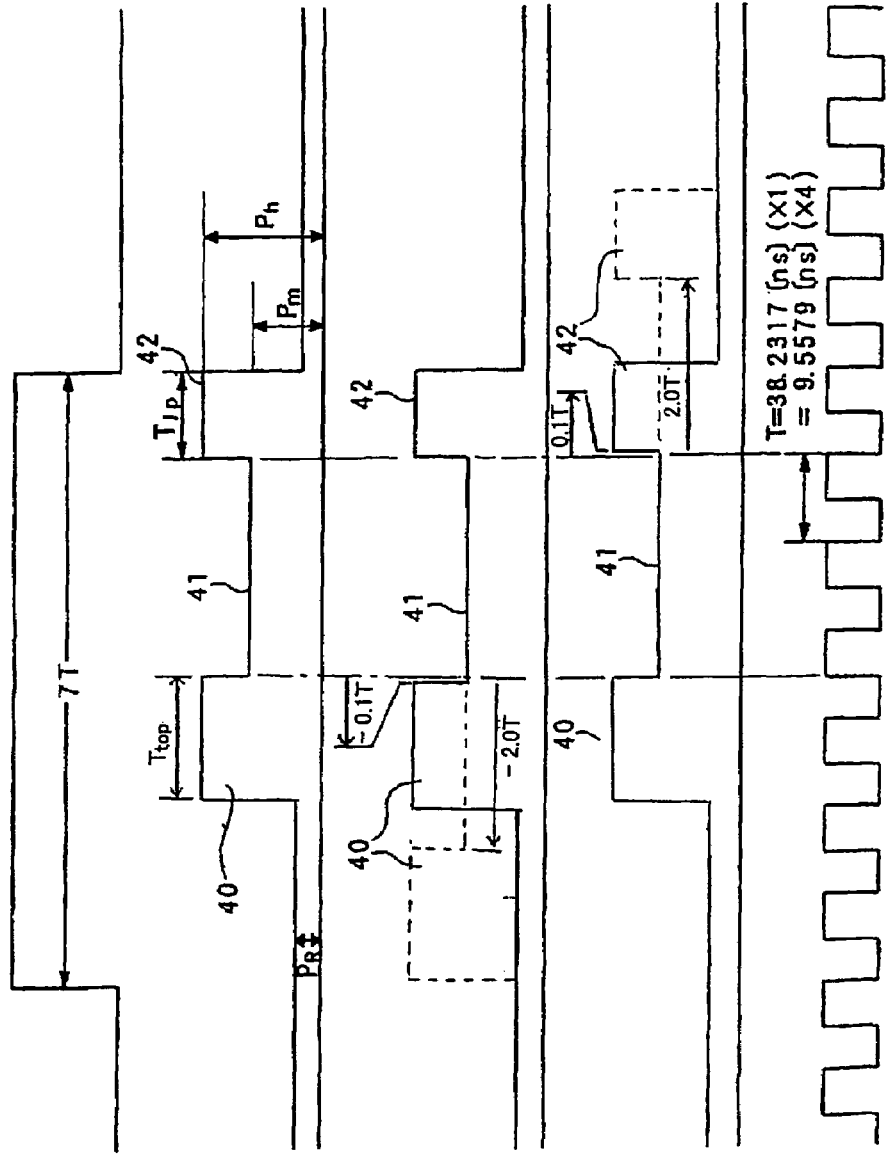

US 7,161,888 B2

INFORMATION RECORDING DEVICE AND INFORMATION RECORDING METHOD

FIELD OF THE INVENTION

This invention relates to a technique for recording information on an optical disc using a laser light or other means.

DESCRIPTION OF RELATED ART

Onto a recordable or rewritable optical disc such as a DVD-R (DVD-Recordable) or a DVD-RW (DVD-Rerecordable), information is recorded thereon by irradiating a laser light on a recording surface of the disc. At the areas on the recording surface of the optical disc where the laser light is irradiated, the property of the optical recording medium forming the optical disc is physically changed because of the increased temperature. This produces recording marks on the recording surface.

Namely, the laser light is modulated by recording pulses having time widths corresponding to information to be recorded, so that the laser pulses having lengths corresponding to information to be recorded are generated and irradiated on the optical disc. Thus, recording marks having lengths corresponding to the information to be recorded can be formed on the optical disc.

One approach recently used is control of a laser power to form a recording mark by a pulse train portion having a plurality of short pulses (referred to as "pulse train"), rather than by a single laser pulse. This approach, called "write strategy", introduces less heat accumulation on the recording surface of the optical disc in comparison with the approach irradiating a single recording laser pulse. Therefore, uniform temperature distribution can be achieved on the recording surface on which the recording marks are formed. This can prevent undesired teardrop-shaped recording marks from being formed, and enables the formation of the recording marks of preferred shape.

The above-mentioned recording pulse train includes a plurality of pulses whose magnitudes vary between a certain read (read out) power level and a write (write in or recording) power level. That is, based on a recording signal, the areas on the recording surface of the optical disc where no recording marks are to be formed (referred to as "space portions" hereafter) are irradiated with the laser light of the read power. The areas on the recording surface of the optical disc where recording marks are to be formed (referred to as "mark portions" hereafter) are irradiated with the laser light of the power corresponding to the recording pulse train whose magnitudes vary between the read power and the write power. Consequently, the recording marks are formed on the recording surface.

FIG. 15 shows an example of the recording pulse waveform by the above-mentioned write strategy. The example in FIG. 15 is the recording pulse waveform of the portion for recording a mark 7 T in the recording data. As shown in FIG. 15, the recording pulse is formed by a single top pulse 90 and a subsequent pulse train (referred to as "multi pulse") 92 including a plurality of pulses 91. For example, the top pulse 90 has 1.5 T pulse width, and each pulse 91 of the subsequent pulse train 92 has 0.5 T pulse width. Both the top pulse 90 and the pulse train 92 are pluses whose magnitudes vary between a write power Pw and a read power Pr.

The top pulse 90 serves as to perform preheat and to form a mark starting portion on the recording surface of the optical disc for the purpose of recording the marks. By irradiating a recording laser corresponding to the top pulse 90 of 1.5 T pulse width, the top pulse 90 brings the recording surface of the optical disc to a melting point. Afterward, the subsequent pulse train 92 forms marks having predetermined length on the recording surface. For example, the pulse train 92 is formed by a series of the plurality of pulses 91 having 0.5 T pulse width (one period including ON and OFF periods is 1 T). Thereby, on the recording surface of the optical disc, 0.5 T laser irradiation, 0.5 T cooling, 0.5 T laser irradiation and . . . are repeated, and the length of the formed mark is controlled.

In the method of using the recording pulse waveform shown in FIG. 15, by assuming the mark length to be recorded as "n", the recording pulse is formed by the single top pulse 90 and the pulse train 92 including the (n-3) pulses 91. By generating the above-mentioned recording pulse in accordance with the mark length to be recorded to drive the recording laser, the marks having the predetermined length are recorded on the recording surface of the optical disc.

Recently, as for a computer peripheral equipment such as a DVD-R drive, a high transmission rate is desired. For obtaining the high transmission rate, it is necessary that disc rotation speed (liner speed) is higher. Accordingly, it is also necessary that the laser power at the time of recording is increased.

However, in various methods, such as the example in FIG. 15, the width of the recording mark is generally expanded according to the increase the recording laser power. Increasing the recording mark width causes problems as follows.

On the DVD-R disc, the recording track (groove) is wobbled at a constant frequency, and address pits called "land prepits" (referred to as "LPPs" hereafter) are formed on a land track between the recording tracks. By the wobbling and the LPP, control of the disc rotation, generating of a recording clock and obtaining information necessary for recording the data, such as a recording address, become possible during recording. However, due to the increase of the recording mark width, the recording marks reach a recording film on the lands and the LPPs, which sometimes causes distortion and destruction of the LPPs. As a result, a recording and reproducing apparatus cannot detect the LPPs, and recording and reproduction on the disc becomes impossible.

Also, on a disc called "DVD+R", due to increase of the recording mark width, leaking of a wobble signal occurs to the recording signal. Thereby, signal quality becomes worse, and the address signal modulated into the wobble signal is not read out.

SUMMARY OF THE INVENTION

The present invention has been achieved in order to solve the above problems. It is an object of this invention to provide an information recording apparatus and an information recording method capable of recording marks of appropriate shape at the time of high-speed recording.

According to one aspect of the present invention, there is provided an information recording apparatus which irradiates a laser light on a recording medium and forms recording marks according to a recording signal, including: a driving source which rotationally drives the recording medium at least at a first rotation speed and a second rotation speed higher than the first rotation speed; a light source which emits the laser light; a signal generating unit which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and a control unit which irradiates a laser pulse on the recording medium by controlling the light source based on the recording pulse signal, wherein the signal generating unit shifts a position of the top pulse ahead of a position of the top pulse in a case that the recording medium is rotationally driven at the first rotation speed, when the recording medium is rotationally driven at the second rotation speed.

According to a similar aspect of the present invention, there is provided an information recording method which irradiates a laser light from a light source on a recording medium and forms recording marks according to a recording signal, including: a driving process which rotationally drives the recording medium at least at a first rotation speed and a second rotation speed higher than the first rotation speed; a signal generating process which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and a control process which irradiates a laser pulse on the recording medium by controlling the light source based on the recording pulse signal, wherein the signal generating process shifts a position of the top pulse ahead of a position of the top pulse in a case that the recording medium is rotationally driven at the first rotation speed, when the recording medium is rotationally driven at the second rotation speed.

In accordance with the above information recording apparatus and a method thereof, information is recorded by irradiating the laser light to the recording medium such as a DVD-R and forming the recording marks, for example. In that case, recording can be performed at least at two kinds of speed. At the time of recording the information at a first recording speed, the recording medium is rotationally driven at the first rotation speed. At the time of recording the information at a second recording speed higher than the first recording speed, the recording medium is rotationally driven at the second rotation speed. The recording pulse signal generated based on the recording signal includes the top pulse located at the front end portion and having a first magnitude, the last pulse located at a back end portion and having the first magnitude, and the intermediate bias pulse portion located between the top pulse and the last pulse and having a second magnitude. The light source is controlled based on the generated recording pulse signal, and the laser pulse is irradiated on the recording medium. Thereby, the recording marks corresponding to the recording signal are formed on the recording medium.

In the generating process of the recording pulse signal, when the recording medium is rotationally driven at the second rotation speed, the position of the top pulse is shifted ahead of the position of the top pulse when the recording medium is rotationally driven at the first rotation speed. At the time of the high-speed recording in which the recording medium is driven at the second rotation speed higher than the first rotation speed, by shifting the position of the top pulse ahead, it can be prevented that the recording marks formed on the recording medium are shortened. As a result, recording marks of appropriate shape can be formed at the time of the high-speed recording, too.

In the above information recording apparatus and the method, it is preferred that the shift quantity of the top pulse is a value between 0.1 T and 2.0 T.

In one mode of the above information recording apparatus and the method, it is preferred that the signal generating unit sets the first magnitude to a value between 1.1 times and 2.0 times of the second magnitude.

According to another aspect of the present invention, there is provided an information recording apparatus which irradiates a laser light on a recording medium and forms recording marks according to a recording signal, including: a driving source which rotationally drives the recording medium at least at a first rotation speed and a second rotation speed higher than the first rotation speed; a light source which emits the laser light; a signal generating unit which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and a control unit which irradiates a laser pulse on the recording medium by controlling the light source based on the recording pulse signal, wherein the signal generating unit shift a position of the last pulse behind a position of the last pulse in a case that the recording medium is rotationally driven at the first rotation speed, when the recording medium is rotationally driven at the second rotation speed.

According to a similar aspect of the present invention, there is provided an information recording method which irradiates a laser light from a light source on a recording medium and forms recording marks according to a recording signal, including: a driving process which rotationally drives the recording medium at least at a first rotation speed and a second rotation speed higher than the first rotation speed; a signal generating process which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and a control process which irradiates a laser pulse on the recording medium by controlling the light source based on the recording pulse signal, wherein the signal generating process shifts a position of the last pulse behind a position of the last pulse in a case that the recording medium is rotationally driven at the first rotation speed, when the recording medium is rotationally driven at the second rotation speed.

In accordance with the above information recording apparatus and the method thereof, the information is recorded by irradiating the laser light to the recording medium such as the DVD-R and forming the recording marks, for example. In that case, recording can be performed at least at two kinds of speed. At the time of recording the information at a first recording speed, the recording medium is rotationally driven at the first rotation speed. At the time of recording the information at a second recording speed higher than the first recording speed, the recording medium is rotationally driven at the second rotation speed. The recording pulse signal generated based on the recording signal includes the top pulse located at a front end portion and having a first magnitude, the last pulse located at a back end portion and having the first magnitude, and an intermediate bias portion located between the top pulse and the last pulse and having a second magnitude. The light source is controlled based on the generated recording pulse signal, and the laser pulse is irradiated on the recording medium. Thereby, the recording marks corresponding to the recording signal are formed on the recording medium.

In the generating process of the recording pulse signal, when the recording medium is rotationally driven at the second rotation speed, the position of the last pulse is shifted behind the position of the last pulse, when the recording medium is rotationally driven at the first rotation speed. At the time of the high-speed recording at which the recording medium is driven at the second rotation speed higher than the first rotation speed, by shifting the position of the last pulse behind, it can be prevented that the recording marks formed on the recording medium are shortened. As a result, recording marks of appropriate shape can be formed at the time of the high-speed recording, too.

In the above information recording apparatus and the method thereof, it is preferred that the shift quantity of the last pulse is a value between 0.1 T and 2.0 T.

In another method of the above information recording apparatus and the method thereof, it is preferred that the signal generating unit sets the first magnitude to a value between 1.1 times and 2.0 times of the second magnitude.

According to still another aspect of the present invention, there is provided an information recording apparatus which irradiates a laser light on a recording medium and forms recording marks according to a recording signal, including: a driving source which rotationally drives the recording medium at least at a first rotation speed and a second rotation speed higher than the first rotation speed; a light source which emits the laser light; a signal generating unit which generates a recording pulse signal including a top pulse located at a front end portion and having a first magnitude, and a pulse train portion having one or a plurality of pulse following the top pulse, based on the recording signal; and a control unit which irradiates a laser pulse on the recording medium by controlling the light source based on the recording pulse signal, wherein the signal generating unit shifts a position of the top pulse ahead of a position of the top pulse in a case that the recording medium is rotationally driven at the first rotation speed, when the recording medium is rotationally driven at the second rotation speed.

According to a similar aspect of the present invention, there is provided an information recording method which irradiates a laser light from a light source on a recording medium and forms recording marks according to a recording signal, including: a driving process which rotationally drives the recording medium at least at a first rotation speed and a second rotation speed higher than the first rotation speed; a signal generating process which generates a recording pulse signal including a top pulse located at a front end portion and having a first magnitude and, and a pulse train portion having one or a plurality of pulse following the top pulse, based on the recording signal; and a control process which irradiates a laser pulse on the recording medium by controlling the light source based on the recording pulse signal, wherein the signal generating process shifts a position of the top pulse ahead of a position of the top pulse in a case that the recording medium is rotationally driven at the first rotation speed, when the recording medium is rotationally driven at the second rotation speed.

In accordance with the above information recording apparatus and a method thereof, the information is recorded by irradiating the laser light to the recording medium such as the DVD-R and forming the recording marks, for example. In that case, recording can be performed at least at two kinds of speed. At the time of recording the information at a first recording speed, the recording medium is rotationally driven at the first rotation speed. At the time of recording the information at a second recording speed higher than the first recording speed, the recording medium is rotationally driven at the second rotation speed. The recording pulse signal generated based on the recording signal includes the top pulse located at the front end portion and having the first magnitude, and the pulse train portion having one or the plurality of pulse following the top pulse. The light source is controlled based on the generated recording pulse signal, and the laser pulse is irradiated on the recording medium. Thereby, the recording marks corresponding to the recording signal are formed on the recording medium.

In the generating process of the recording pulse signal, when the recording medium is rotationally driven at the second rotation speed, the position of the top pulse is shifted ahead of the position of the top pulse in the case that the recording medium is rotationally driven at the first rotation speed. At the time of the high-speed recording in which the recording medium is driven at the second rotation speed higher than the first rotation speed, by shifting the position of the top pulse ahead, it can be prevented that the recording marks formed on the recording medium are shortened. As a result, recording marks of appropriate shape can be formed at the time of the high-speed recording.

In the above information recording apparatus and the method thereof, it is preferred that the shift quantity of the last pulse is a value between 0.1 T and 1.5 T.

In another method of the above information recording apparatus and the method thereof, it is preferred that the signal generating unit sets a duty ratio of the pulse train portion to a value between 0.3 and 0.9.

BRIEF DESCRIPTION OF THE DRAWINGS

FIGS. 7A to 7E are waveform diagrams showing examples of recording pulse waveforms by an improved write strategy of the present invention.

FIGS. 9A to 9D show characteristics by the improved write strategy of the present invention in comparison with characteristics of comparative examples.

FIGS. 12A to 12D show examples that the improved write strategy of the present invention is applied to a normal write strategy.

FIGS. 13A to 13D show exampled that the improved write strategy of the present invention is applied to a normal write strategy.

FIGS. 14A to 14E are waveform diagrams showing another examples of recording pulse waveforms by the improved write strategy of the present invention.

DETAILED DESCRIPTION OF THE PREFERRED EMBODIMENTS

The preferred embodiments of the present invention will now be described below with reference to the attached drawings.

[Configuration of Apparatus]

Figure 1:
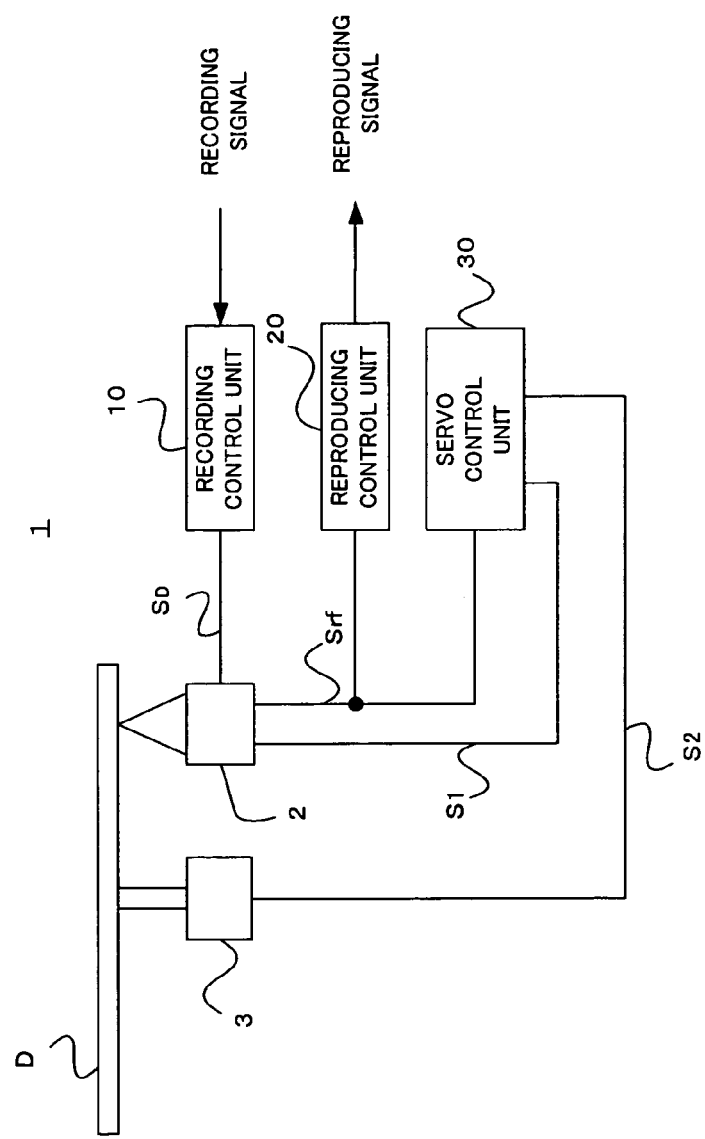
FIG. 1 is a block diagram schematically showing a configuration of an information recording and reproducing apparatus to which the present invention is applied.

FIG. 1 schematically shows a whole configuration of the information recording and reproducing apparatus according to the embodiment of the present invention. An information recording and reproducing apparatus 1 records the information on an optical disc D, and reproduces the information from the optical disc D. For example, the optical disc D may be a CD-R (Compact Disc-Recordable) and a DVD-R for recording only once, and a CD-RW (Compact Disc-Rewritable) and a DVD-RW that allow for repeated erasing and recording of information.

The information recording and reproducing apparatus 1 includes an optical pickup 2 which irradiates a recording beam and a reproducing beam on the optical disc D, a spindle motor 3 which controls rotation of the optical disc D, a recording control unit 10 which controls the recording of the information on the optical disc D, a reproducing control unit 20 which controls reproduction of the information already recorded on the optical disc D, and a servo control unit 30 which executes various kinds of servo control including a spindle servo which controls rotation of the spindle motor 3, and a focus servo and a tracking servo, both of which are relative position control of the optical pickup 2 with respect to the optical disc D.

The recording control unit 10 receives the recording signal and generates a driving signal SD for driving a laser diode inside the optical pickup 2 by a process described below, and supplies the signal SD to the optical pickup 2.

The reproducing control unit 20 receives a read-out RF signal Srf which is outputted from the optical pickup 2, and generates and outputs a reproducing signal by executing a predetermined demodulating process and a decoding process to the signal Srf.

The servo control unit 30 receives the read-out RF signal Srf from the optical pickup 2, and, based on the signal, supplies a servo signal S1 such as a tracking error signal and a focus signal to the optical pickup 2, and also supplies a spindle servo signal S2 to the spindle motor 3. Thus, various kinds of servo processes, such as a tracking servo, a focus servo and a spindle servo, are executed.

In the present invention, which mainly relates to the recording method by the recording control unit 10, various kinds of known methods can be applied to the reproducing control and the servo control. Therefore, explanations thereof are not given in detail here.

Though FIG. 1 illustrates the information recording and reproducing apparatus as the embodiment of the present invention, it is also possible to apply the present invention to an information recording apparatus dedicated to recording.

Figure 2:
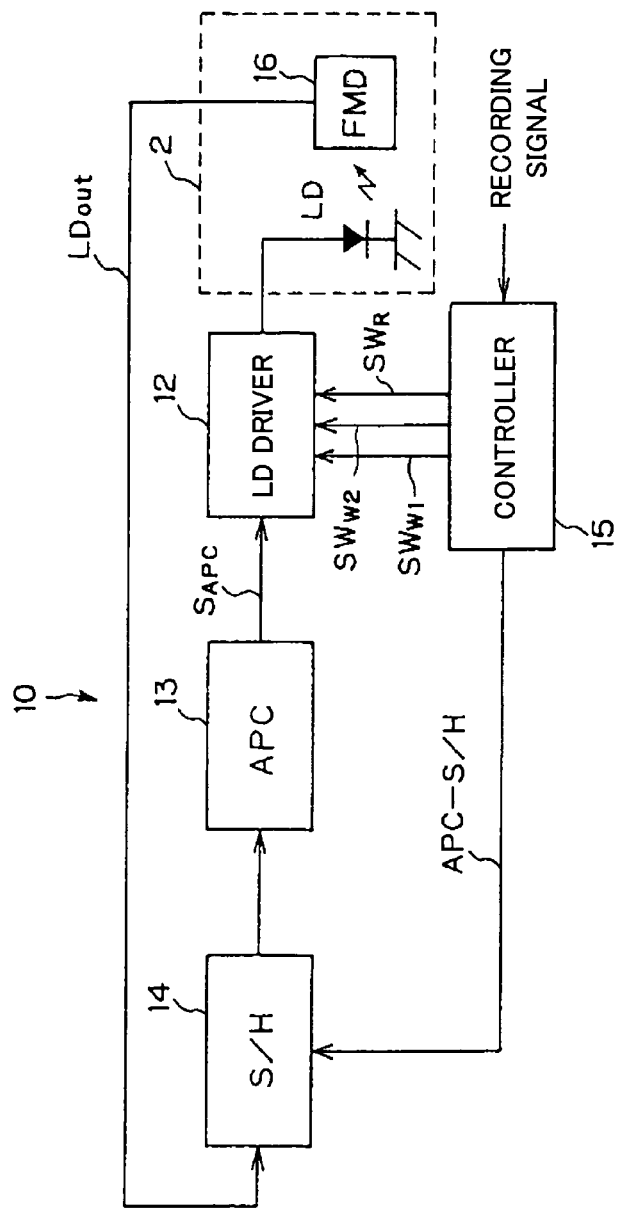
FIG. 2 is a block diagram showing a configuration of a recording control unit shown in FIG. 1.

FIG. 2 shows internal configurations of the optical pickup 2 and the recording control unit 10. As shown in FIG. 2, the optical pickup 2 includes a laser diode LD which generates the recording beam for recording the information on the optical disc D and the reproducing beam for reproducing the information from the optical disc D, and a front monitor diode (FMD) 16 which receives the laser light emitted from the laser diode LD and outputs a laser power level signal LDout corresponding to the laser light.

The optical pickup 2 additionally includes a light detector which receives a reflected beam of the reproducing beam by the optical disc D to generate the read-out RF signal Srf, and well-known components such as an optical system which guides the recording beam, the reproducing beam and the reflected beam to appropriate directions. However, drawings and detailed explanations thereof are omitted here.

On the other hand, the recording control unit 10 includes a laser diode (LD) driver 12, an APC (Automatic Power Control) circuit 13, a sample hold (S/H) circuit 14 and a controller 15.

The LD driver 12 supplies, to the laser diode LD, the current corresponding to the recording signal, and records the information on the optical disc D. The front monitor diode 16, which is provided near the laser diode LD in the optical pickup 2, receives the laser light emitted from the laser diode LD and outputs the laser power level signal LDout indicating a level thereof.

A sample hold circuit 14 samples and holds the level of the laser power level signal LDout at timing prescribed by a sample hold signal APC-S/H. Based on the output signal of the sample hold circuit 14, the APC circuit 13 executes power control of the LD driver 12 so that the read power level of the laser light emitted from the laser diode LD is constant.

The controller 15 mainly performs a recording operation and an APC operation. First, the recording operation will be explained. In the recording operation, the controller 15 generates switching signals SWR, SWW1 and SWW2 of the switches which control a current quantity supplied to the laser diode LD, and supplies them to the LD driver 12.

Figure 3:
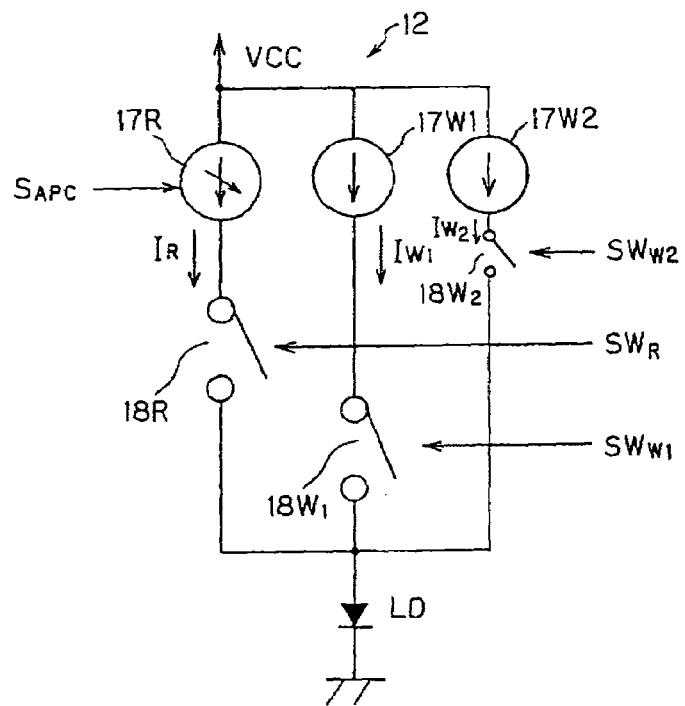
FIG. 3 is a diagram showing a configuration of an LD driver shown in FIG. 2.

FIG. 3 shows a detailed configuration of the LD driver 12. As shown in FIG. 3, the LD driver 12 includes a current source 17R for a read level, current sources 17W1 and 17W2 for a write level, and switches 18R, 18W1 and 18W2.

The current source 17R for the read level flows a driving current IR for making the laser diode LD emit the laser light with the read power, and the driving current IR is supplied to the laser diode LD via the switch 18R. Therefore, when the switch 18R is set to an ON state, the driving current IR of the read power is supplied to the laser diode LD. When the switch 18R is set to an OFF state, supplying of the driving current IR is stopped. The quantity of the driving current IR from the current source 17R varies by a control signal SAPC.

The current sources 17W1 and 17W2 for the write level flow driving current IW1 and IW2, to the laser diode LD, for emitting the laser light with the write power respectively. The driving current IW1 is supplied to the laser diode LD via the switch 18W1, and the driving current IW2 is supplied to the laser diode LD via the switch 18W2.

Figure 5:
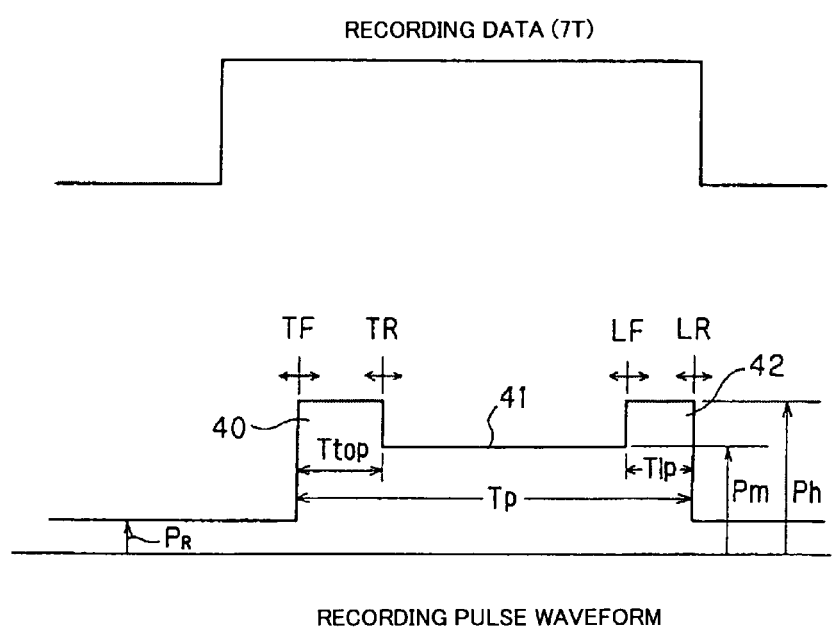
FIG. 5 is a waveform diagram showing an example of a recording pulse waveform by a basic write strategy.

In the write strategy according to the present invention, two levels of write powers, i.e., a first write power Ph and a second write power Pm lower than the first write power Ph are used (see FIG. 5). When the switch 18W1 is set to the ON state with the switch 18R in the ON state, a total driving current of the driving currents IR and IW1 is supplied to the laser diode LD. Thereby, the laser diode is driven by the second write power Pm. In addition, when the switch 18W2 is set to the ON state with the switches 18R and 18W1 in the ON state, the driving current IW2 is additionally supplied to the laser diode LD. As a result, a total driving current of the driving currents IR, IW1 and IW2 is flown to the laser diode LD, and the laser diode LD is driven by the first write power Ph. When the switch 18W1 is set to the OFF state, the supply of the driving current IW1 is stopped. When the switch 18W2 is set to the OFF state, the supply of the driving current IW2 is stopped.

Figure 4:
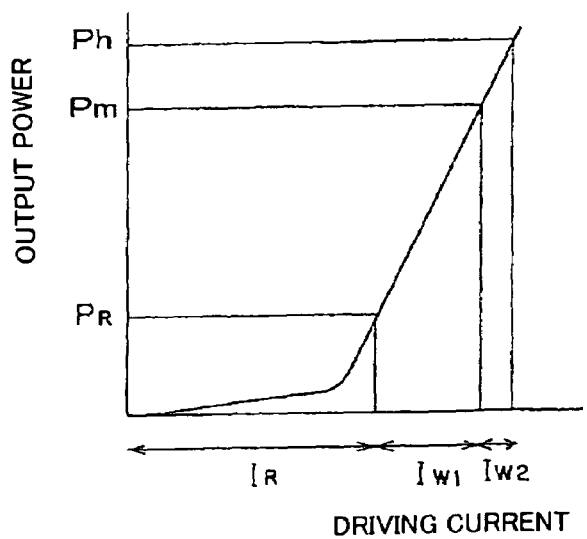
FIG. 4 is a graph showing a relation between a driving current given to a laser diode and an output power.

FIG. 4 shows a relation between the driving current supplied to the laser diode LD and the output power of the laser light emitted from the laser diode LD. As understood from FIG. 4, when the driving current IR is supplied to the laser diode LD, the laser light is emitted with the read power PR. In that state, by further adding the driving current IW1, the laser light is emitted with the second write power Pm. By further adding the driving current IW2, the laser light is emitted with the first write power Ph.

At the time of recording the information on the optical disc, basically, the driving current IR is always supplied, and the laser light is emitted with the read power PR. Additionally, if the driving currents IW1 and IW2 are added in accordance with the recording pulse, the first write power Ph or the second write power Pm is applied, and the information is recorded on the optical disc.

Next, the APC operation will be explained. The APC operation is for adjusting the driving current level supplied from the LD driver 12 to the laser diode LD so that the level of the read power of the laser light outputted by the laser diode LD becomes constant. In detail, in a long space period (e.g., 5 T to 11 T and 14 T space periods) of the space portion of the recording signal (which is 8-16 modulated, and which has the mark period and the space period of 3 T to 11 T and 14 T lengths), the driving signal SD from the recording control unit 10 is adjusted so that the level of the read power is constant.

Concretely, the APC operation is performed as follows. The controller 15 generates the recording pulse corresponding to the recording signal as described above, and drives the LD driver 12 by the recording pulse to emit the laser light from the laser diode LD.

The front monitor diode 16, which is provided near the laser diode LD in the optical pickup 2, receives the laser light emitted from the laser diode LD, and generates the laser power level signal LDout indicating its level to supply it to the sample hold circuit 14.

The sample hold circuit 14 samples the laser power level signal LDout supplied from the front monitor diode 16 at the timing given by the sample hold signal APC-S/H inputted from the controller 15, and holds its level for a predetermined period. The sample hold signal APC-S/H outputted from the controller 15 is a pulse indicating a period (referred to as "APC period") in which the APC is executed.

Thus, the sample hold circuit 14 holds the level of the laser power level signal LDout in the APC period in the space period of the recording signal, and supplies it to the APC circuit 13. The APC circuit 13 supplies the control signal SAPC to the LD driver 12 so that the level of the laser power level signal LDout in the APC period becomes constant.

As shown in FIG. 3, the control signal SAPC is inputted to the current source 17R for the read level in the LD driver 12. Thereby, in accordance with the control signal SAPC, the current IR flowing from the current source 17R for the read level varies. Namely, the APC is executed so that the read power level obtained by the laser diode LD becomes constant.

[Write Strategy]

Next, the write strategy according to the present invention will be explained.

(Basic Write Strategy)

First, FIG. 5 shows the recording pulse waveform by a basic write strategy. As shown in FIG. 5, the recording pulse waveform by the basic write strategy is formed by three portions, i.e., a top pulse 40, an intermediate bias portion 41 and a last pulse 42. In portions other than those portions, the recording pulse waveform is maintained at the level of the read power PR.

The write powers of two values are utilized for the basic write strategy. The top pulse 40 and the last pulse 42 have the first write power Ph, and the intermediate bias portion 41 has the second write power Pm. Though the second write power Pm is higher than the read power PR, it is set to be lower than the first write power Ph.

The top pulse 40 preheats the recording surface of the optical disc, and forms the mark starting portion for the purpose of recording the mark. A time width of the intermediate bias portion 41 varies in accordance with the length of the recording data. The last pulse 42 mainly has a function to adjust a shape of the back end portion of the mark. Basically, the length of the formed recording mark is controlled by a top pulse width Ttop, a last pulse width T1p, a width Tp from the front end portion of the top pulse to the back end portion of the last pulse, and the first write power Ph, and the width of the formed recording mark is controlled by the second write power Pm.

Figure 6:
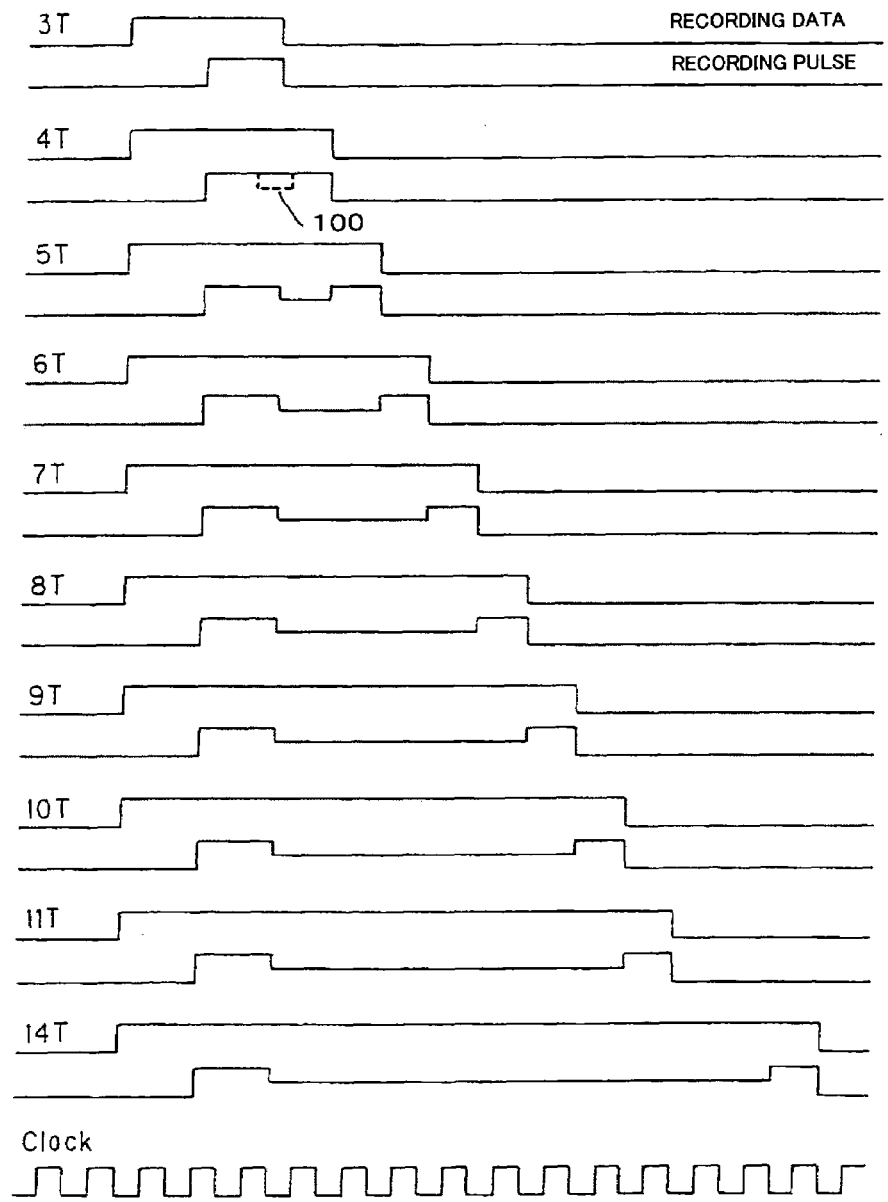
FIG. 6 is a waveform diagram showing recording pulse waveforms of 3 T to 11 T and 14 T lengths by a basic write strategy.

FIG. 6 shows the recording pulse waveform corresponding to each mark length to be recorded. The recording data is 8-16 modulated, and has the mark period and the space period of 3 T to 11 T and 14 T lengths. As shown in FIG. 6, a front edge of the recording pulse waveform is always located at the position behind 1.5 T from the front edge of the recording data, irrespective of the mark length. The recording pulse waveforms of the recording data of 3 T and 4 T do not have the intermediate bias portion 41, and the top pulse 40 and the last pulse 42 are synthesized to form the single pulse. The power of this pulse is the first write power Ph, which is identical to the powers of the top pulse and the last pulse.

When the recording data is equal to or larger than 5 T, the length of the intermediate bias portion 41 increases in accordance with each length. The pulse widths of the top pulse 40 and the last pulse 42 are basically almost constant respectively, and the widths do not have to be largely varied in accordance with the recording data length, differently from the intermediate bias portion 41.

In the example of FIG. 6, when the recording data is 4 T, the top pulse and the last pulse are synthesized to form the single pulse waveform. However, as shown by a broken line 100 in FIG. 6, when the recording data is 4 T, the recording pulse waveform can also be determined so that the intermediate bias portion is provided.

When the recording speed is higher, the clock also becomes higher correspondingly. Therefore, not only the recording data of 3 T and 4 T, but also the recording data equal to or larger than 5 T may have the single-pulse-type recording pulse wave forms without the intermediate bias portion.

(Improved Write Strategy)

Next, an improved write strategy of the present invention will be explained. The improved write strategy is based on the above-mentioned basic write strategy, and is further suitable for the high-speed recording. For example, in an information recording apparatus capable of recording the information at different speeds of two or more kinds, the recording is performed at the normal speed by using the above-mentioned basic write strategy, and the recording can be performed at a speed higher than the normal speed by using the improved write strategy, which will be explained as follows.

When the disc rotation speed is increased for performing the high-speed recording, the recording laser power also has to be increased correspondingly to the increase of the disc rotation speed in order to appropriately form the recording marks. However, if the recording laser power is increased too much, the width of the recording mark formed on the recording track of the disc becomes wider than needed. As a result, a problem occurs, e.g., a malfunction occurs to the detection of the LPP. The improved write strategy of the present invention can form the recording marks of appropriate width, even when the disc rotation speed is increased for the high-speed recording.

As described above, it is the write power Pm of the intermediate bias portion 41 that affects the width of the formed recording mark most in the basic write strategy. Therefore, if the write power Pm is decreased, the width of the recording mark becomes small, and a modulation can be decreased. The modulation is a value indicating a ratio (I14/I14H) of an magnitude I14 of the reproducing signal corresponding to a longest recording mark and a longest space, with respect to a difference I14H between a peak value and the zero level of the reproducing signal corresponding to a longest space portion (14T space). According to a DVD-R standard book, the modulation equal to or larger than 0.60 (60%) is required.

However, if the modulation is decreased by decreasing only the write power Pm of the intermediate bias portion 41, a distortion occurs to the reproduced waveform. As a result, problems occur, such as the increase of jitters in recording and reproduction, the increase of read-out errors of the recording marks, the increase of error rates, and the like. Additionally, if the reproducing process is executed by using a distorted reproduced waveform, a probability of erroneous detection of the recording data is increased. Further, if the recording is performed by decreasing only the write power Pm in the intermediate bias portion 41, the shape of the recording mark formed on the disc becomes wide at the front end portion and the back end portion corresponding to the top pulse 40 and the last pulse 42, and becomes narrow only at the intermediate portion corresponding to the intermediate bias portion 41. The wide front and back end portions give an adverse effect to the shape of the LPP.

In order to overcome such problem, if not only the level of the write power Pm in the intermediate bias portion 41 but also the level of the write power Ph corresponding to the top pulse 40 and the last pulse 42 are decreased, the distortion of the reproduced wave form can be suppressed. However, as described above, the write power Ph corresponding to the top pulse 40 and the last pulse 42 affects the length of the formed recording mark. Therefore, if the write power Ph corresponding to the top pulse 40 and the last pulse 42 is decreased for suppressing the distortion of the reproduced waveform, the length of the recording mark becomes short, and the erroneous detection of the recording data may occur.

Therefore, in the improved write strategy of the present invention, the width Tp from the front end portion of the top pulse to the back end portion of the last pulse is enlarged by shifting the position of the top pulse 40 ahead by a predetermined quantity or by shifting the position of the last pulse 42 behind by a predetermined quantity, and it is thereby prevented that the length of the recording mark is shortened. Namely, in the improved write strategy of the present invention, two improved points below are prescribed to be simultaneously performed:

(Improved point 1): Shifting the position of the top pulse 40 ahead by a predetermined quantity, or shifting the position of the last pulse 42 behind by a predetermined quantity; and (Improved point 2): Decreasing the write power Pm corresponding to the intermediate bias portion 41.

In addition to the above two points, as the need arises, an improved point 3 below is performed:

(Improved point 3): Decreasing the write power Ph corresponding to the top pulse 40 and the last pulse 42.

According to the improved write strategy, extension of the recording mark width is suppressed by reducing the write power Pm of the intermediate bias portion 41. Though the distortion occurs to the reproduced waveform by reducing the write power Pm, the distortion is suppressed by reducing the write power Ph corresponding to the top pulse 40 and the last pulse 42 as the need arises. Though the lengths of the whole recording marks are shortened by reducing the write power Ph, by shifting the position of the top pulse 40 ahead or shifting the position of the last pulse 42 behind according to the shortened quantity, the lengths of the whole formed recording marks are maintained to appropriate lengths. As described above, at the time of the high-speed recording, even when the recording laser power is increased, the extension of the recording mark width can be prevented, and the occurrence of the distortion can also be suppressed.

FIGS. 7A to 7E show examples of the recording pulse waveforms by the improved write strategy of the present invention. FIG. 7A is the waveform of the recording data, and FIG. 7B is the recording pulse waveform by the basic write strategy. FIGS. 7C and 7D are the examples of the recording pulse waveforms by the improved write strategy, and FIG. 7E is a clock waveform.

As for the recording pulse waveform by the improved write strategy shown in FIG. 7C, the position of the top pulse 40 is shifted ahead by 0.5 T in comparison with the position of the top pulse 40 of the recording pulse waveform by the basic write strategy shown in FIG. 7B. It is noted that the shift quantity is merely an example, and the value between 0.1 T to 1.5 T can be taken dependently upon the optical disc. The write power Pm of the intermediate bias portion 41 by the improved write strategy becomes smaller than the write power Pm of the intermediate bias portion 41 of the recording pulse waveform by the basic write strategy. Moreover, the write power Ph of the top pulse 40 and the last pulse 42 by the improved write strategy becomes smaller than the write power Ph of the top pulse 40 and the last pulse 42 of the recording pulse waveform by the basic write strategy, and can take the value of 1.1 to 2.0-times of the write power Pm of the intermediate bias portion 41 by the improved write strategy.

On the other hand, in the example of the recording pulse waveform by the improved write strategy shown in FIG. 7D, the position of the last pulse 42 is shifted behind by 0.5 T in comparison with the example of the recording pulse waveform by the basic write strategy shown in FIG. 7B. The shift quantity is merely an example, and can take the value between 0.1 T and 1.5 T dependently upon the optical disc. The write power Pm of the intermediate bias portion 41 becomes smaller than the write power Pm of the intermediate bias portion 41 of the recording pulse waveform by the basic write strategy. Further, the write power Ph of the top pulse 40 and the last pulse 42 of the recording pulse waveform becomes smaller than the write power Ph of the top pulse 40 and the last pulse 42 of the recording pulse waveform by the basic write strategy, and can take the value between 1.1 times and 2.0 times of the write power Pm of the intermediate bias portion 41 by the improved write strategy. Those are identical to the example of the recording pulse waveform shown in FIG. 7C.

In the improved write strategy of the present invention, it is dispensable to reduce the write power Ph corresponding to the top pulse 40 and the last pulse 42 (i.e., the Improved point 3). Basically, when the quantity of reducing the write power Pm of the intermediate bias portion 41 is large, unless the write power Ph is reduced to some extent in accordance with the quantity, the distortion of the signal waveform becomes large. In the present invention, whether the write power Ph is reduced or not, or how much the write power Ph is reduced if reduced are determined dependently on the quantity of shifting the top pulse or the last pulse by the Improved point 1, and on the quantity of reducing the write power Pm of the intermediate bias portion by the Improved point 2.

Figure 8:
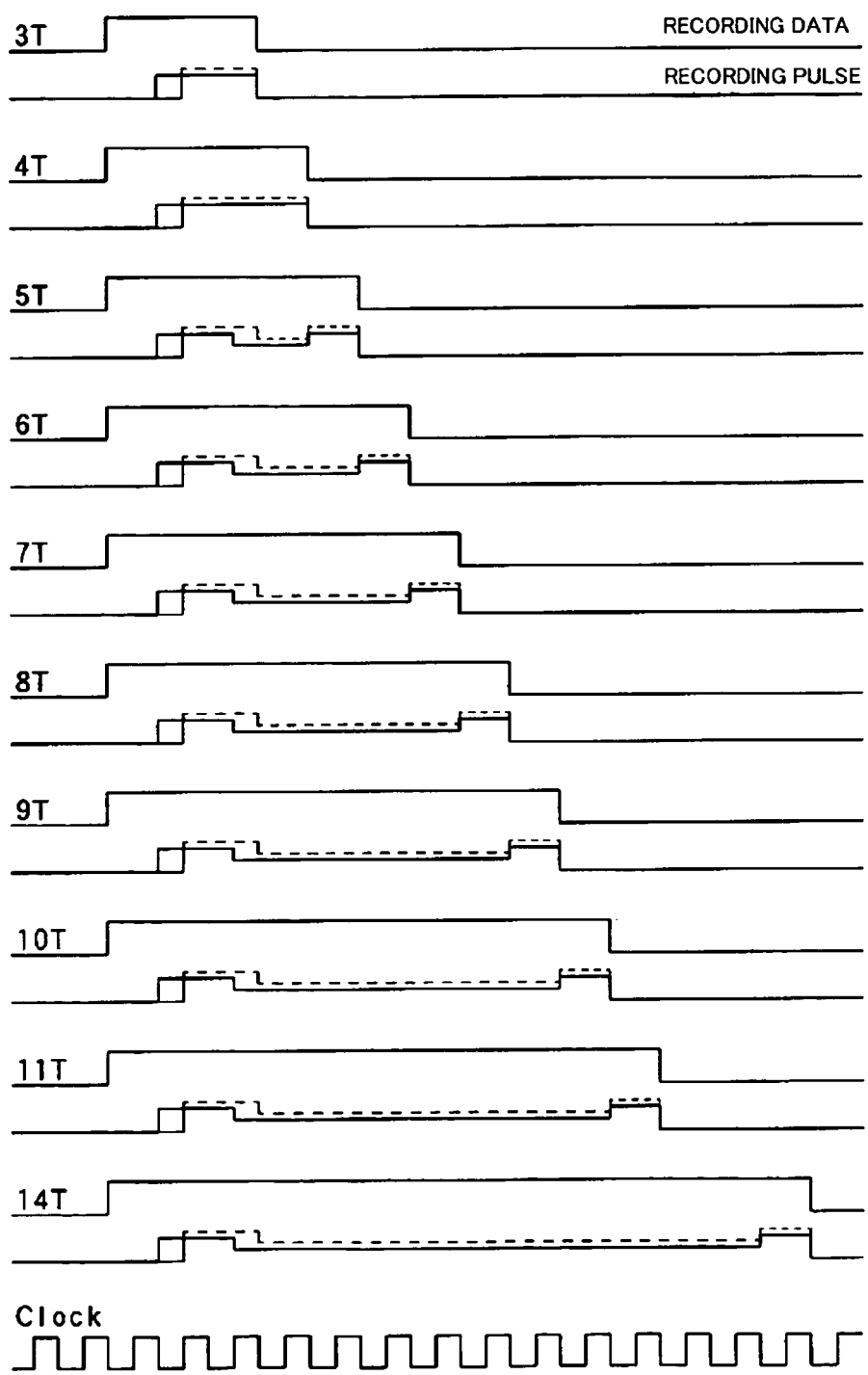
FIG. 8 is a waveform diagram showing recording pulse waveforms of 3 T to 11 T and 14 T lengths by the improved write strategy of the present invention.

FIG. 8 shows the recording pulse waveforms corresponding to the recording data 3 T to 11 T and 14 T by the improved write strategy of the present invention. It is noted that the recording pulse waveforms of 3 T to 11 T and 14 T by the basic write strategy at the same recording speed are indicated by broken lines, for the sake of comparison. According to the present improved write strategy, the recording pulse waveforms corresponding to the recording data of 3 T and 4 T do not include the intermediate bias portions, but the recording pulse waveforms may include the intermediate bias portions. As the speed increases (e.g., 6-times speed, 8-times speed, . . . ) at the time of the high-speed recording, even the recording pulse waveform corresponding to much longer recording data (e.g., 5 T, 6 T, . . . ) may include no intermediate bias portion.

In the examples shown in FIGS. 7A to 7E, as for the recording pulse waveform corresponding to the recording mark of 7 T, the top pulse is shifted ahead by 0.5 T. The shift quantity is merely the example, and the values between 0.1 T and 1.5 T can be taken dependently upon the optical disc, as described above. However, even when the position of the top pulse 40 is shifted ahead, the front edge of the top pulse is never located ahead of the front edge of the recording data. In the recording pulse waveforms of 3 T to 11 T and 14 T shown in FIG. 8, the shift quantity of the top pulse is identical. However, the top pulse may be shifted at an identical rate in accordance with the length of each recording pulse.

Next, characteristics obtained by the improved write strategy will be examined in comparison with characteristics obtained by comparative examples in which the basic write strategy is used, with reference to FIGS. 9A to 9D. In the characteristic graphs shown in FIGS. 9A to 9D, STG1 indicates a characteristic in a case that the recording pulse waveform by the basic write strategy shown in FIG. 7B is used. STG2 is a characteristic of a comparative example in that the write power Pm of the intermediate bias portion 41 is made smaller and the pulse widths of the top pulse 40 and the last pulse 42 are made longer, in the recording pulse waveform by the identical basic write strategy. STG3 is a characteristic of a comparative example in that the write power Pm of the intermediate bias portion 41 is made much smaller than the case of STG2 and the pulse widths of the top pulse 40 and the last pulse 42 are made much longer than the case of STG2, in the recording pulse waveform by the identical basic write strategy.

On the other hand, STG4 is a characteristic of the recording pulse waveform by the improved write strategy shown in FIG. 7C, in that the position of the top pulse 40 is shifted ahead by 0.5 T and the write power Pm of the intermediate bias portion 41 is decreased. STG5 is also a characteristic of the recording pulse waveform by the improved write strategy, in that the position of the top pulse 40 is shifted ahead by 1.0 T and the write power Pm of the intermediate bias portion 41 is made much smaller than the case of STG4.

Figure 10:
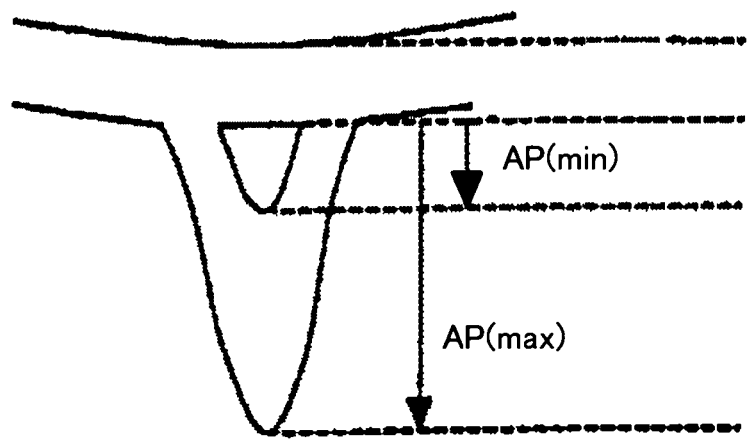
FIG. 10 is a diagram for explaining AR.

In FIGS. 9A and 9B, the horizontal axes indicate the write power Pm of the intermediate bias portion, and the vertical axes indicate the modulation. In FIGS. 9C and 9D, the horizontal axes similarly indicate the write power Pm of the intermediate bias portion, and the vertical axes indicate an AR. As shown in FIG. 10, the AR (Aperture Ratio after recording) is a ratio (AP(max)/AP(min)) of a maximum AP (max) and a minimum AP (min) of an LPP signal appearing in a push-pull signal after recording, and is a value indicating quality of the LPP. As the AR value becomes larger, an influence which the formed recording mark gives the LPP on a neighboring land becomes smaller. According to a DVD-R disc standard book, AR>15% is required. According toa DVD-RW disc standard book, AR>10% is required.

As understood by comparing FIGS. 9A and 9B, in the characteristics STG4 and STG5 by the improved write strategy, as the write power Pm of the intermediate bias portion is decreased, the modulation is decreased correspondingly. On the other hand, in the characteristics STG2 and STG3 of the comparative examples, the decreasing degree of the modulation in response to the decrease of the write power Pm of the intermediate bias portion is small, in comparison with the case of the improved write strategy. Namely, the improved write strategy can effectively decrease the modulation by the decrease of the write power Pm of the intermediate bias portion.

Next, as understood by comparing FIGS. 9C and 9D, in the characteristics STG4 and STG5 by the improved write strategy, when the write power Pm of the intermediate bias portion is decreased, the AR value remarkably increases. On the other hand, in the characteristics STG2 and STG3 of the comparative examples, even if the write power Pm of the intermediate bias portion is decreased, the distortion increases, and the AR value does not increase so much. Therefore, the decrease of the write power Pm of the intermediate bias portion in the improved write strategy more effectively contributes to the increase of the AR value, and it can be prevented that the formed recording mark affects the LPPs on the land track.

Figure 11A:
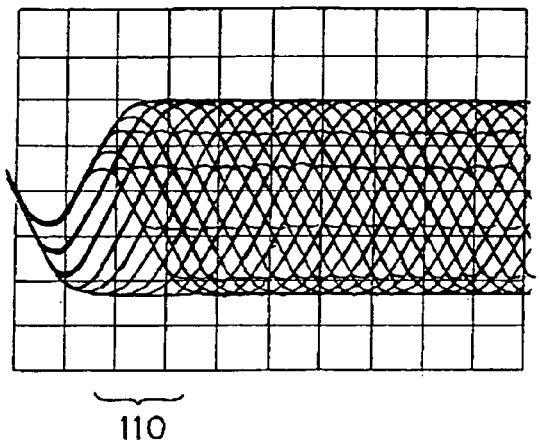
FIGS. 11A to 11C show reproducing signal waveforms by the improved write strategy of the present invention in comparison with reproducing signal waveforms of comparative examples.
Figure 11B:
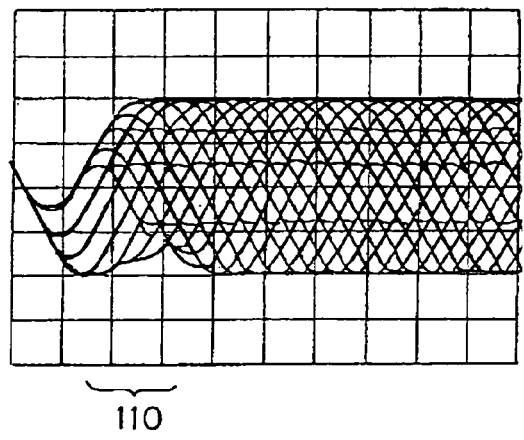
Figure 11C:
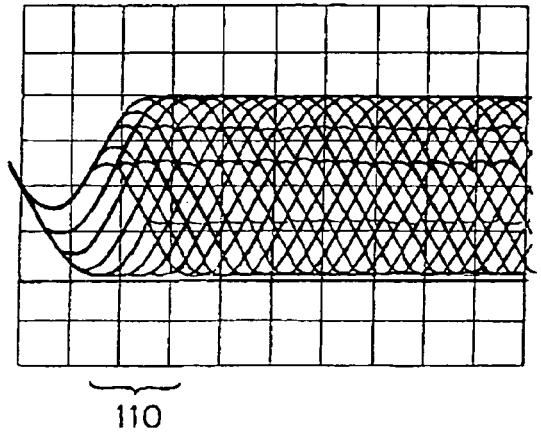

FIGS. 11A to 11C show waveform examples of the reproducing signal of the above-mentioned comparative examples and the improved write strategy. FIG. 11A shows the reproducing signal waveform in a case that the recording is performed by the basic write strategy (STG1) for comparison. FIG. 11B shows the example of the reproducing signal waveform of the mark recorded by the above-mentioned comparative example (STG3). FIG. 11C shows the example of the reproducing signal waveform of the mark recorded by the improved write strategy (STG5) of the present invention. If the waveform around a reference numeral 110 in each graph is taken notice of, though the lowest level of each waveform corresponding to 3 T to 11 T and 14 T is equal in the reproducing signal waveform shown in FIG. 11A, the modulation is large, and the effect given to the LPPs is also large. As for the reproducing signal waveform of the comparative example shown in FIG. 11B, though the modulation becomes smaller in comparison with FIG. 11A, the lowest level of each waveform is not equal.

The lowest levels of the reproducing signal waveforms corresponding to the central portions of the recording marks longer than 7 T to 8 T become high, and the wave forms are distorted. This is because the long recording mark is formed with the narrow center portion, like a shape of a gourd. On the other hand, in the example of the reproducing signal waveform of the improved write strategy shown in FIG. 11C, the modulation becomes small in comparison with FIG. 11A, and the lowest level of the reproducing signal waveform of each recording mark is equal.

As explained above, in the improved write strategy of the present invention, increasing of the formed recording mark width can be suppressed without the distortion occurring to the reproducing signal waveform by:

(1) shifting the position of the top pulse ahead, or shifting the position of the last pulse behind; and (2) decreasing the write power Ph of the top pulse and the write power Pm of the intermediate bias portion in accordance with the shift quantity.

[Other Applications]

Figure 15:
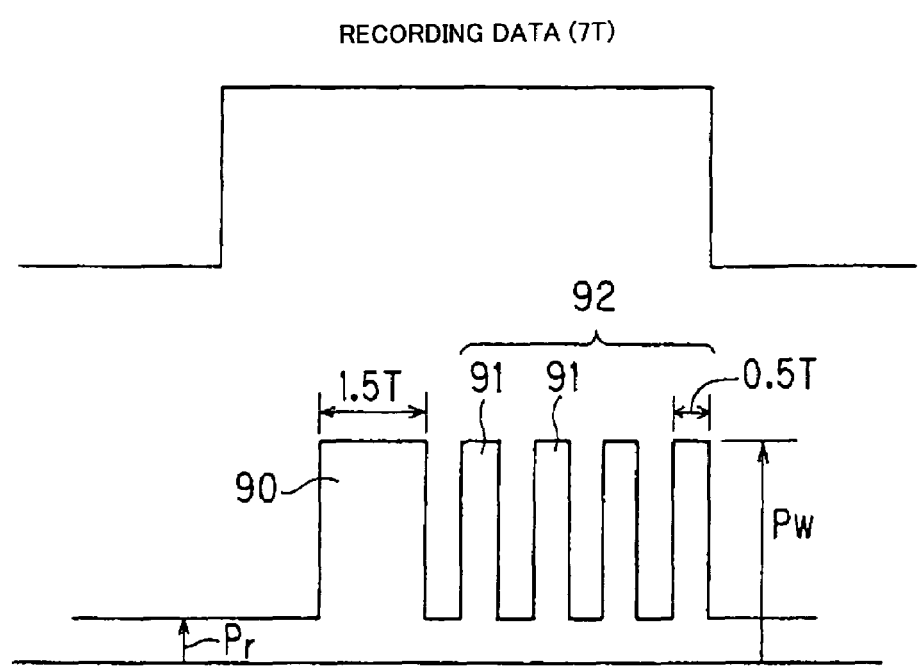
FIG. 15 shows a waveform example of a recording pulse waveform by a normal write strategy.

The above-mentioned improved write strategy is based on the basic write strategy as shown in FIG. 5. However, the concept of the improved write strategy of the present invention can be similarly applied to the normal write strategy shown in FIG. 15, too.

FIGS. 12A to 12D and FIGS. 13A to 13D show application examples in a case that the concept of the improved write strategy of the present invention is applied to the normal write strategy. FIG. 12A shows the recording data waveform, and FIG. 12B shows the recording pulse waveform before the improvement of the normal write strategy, formed by the top pulse and the pulse train. FIG. 12C shows an example of the recording pulse waveform in a case that the concept of the improved write strategy of the present invention is applied to the normal write strategy. As understood by comparing FIGS. 12B and 12C, in the recording pulse waveform to which the present invention is applied, the position of a top pulse 70 is shifted ahead by 0.5 T. The pulse width of each pulse 71 forming a pulse train 72 is decreased. It is noted that the values between 0.3 and 0.9 can be taken dependently upon the disc as a duty ratio (width of pulse 71/period of pulse 71) of the pulse train 72. This is equivalent to decreasing of the level of the intermediate bias portion in the above-mentioned basic write strategy.

Also, in the examples shown in FIGS. 13A to 13D, FIG. 13A shows the recording data waveform, and FIG. 13B shows the recording pulse waveform before the improvement of the normal write strategy, formed by the top pulse and the pulse train. FIG. 13C shows the example of the recording pulse waveform in the case that the concept of the improved write strategy of the present invention is applied to the normal write strategy.

In the examples shown in FIGS. 12A to 12D, only the top pulse 70 is shifted ahead, and the positions of the pulses 71 forming the pulse train 72 are not moved. However, in the examples shown in FIGS. 13A to 13D, each pulse 71 forming the pulse train 72 is equally moved in accordance with the shift quantity of the top pulse 70. Namely, according to a rate of increasing time width of the whole recording pulses by movement of the top pulse 70, the position of each pulse 71 is shifted. Identically to FIG. 12C, the pulse width of each pulse 71 forming the pulse train 72 is decreased. This is equivalent to decreasing the level of the intermediate bias portion in the above-mentioned basic write strategy.

By the examples shown in FIGS. 12C and 13C, the effect identical to the improved write strategy shown in FIG. 7C can be obtained.

It is noted that the present invention is not limited to the above-mentioned embodiment. For example, according to FIG. 7C, the position of the top pulse is shifted ahead by the predetermined quantity, and according to FIG. 7D, the position of the last pulse is shifted behind by the predetermined quantity. However, by shifting the positions of the top pulse and the last pulse ahead and behind, respectively, the recording mark length may be controlled to be a desired length.

As shown in FIG. 14B, when the position of the top pulse 40 of the basic write strategy is behind by 0.5 T with respect to the position of the top pulse 40 of the basic write strategy shown in FIG. 7B, the position of the top pulse 40 of the improved write strategy shown in FIG. 14C can be shifted ahead between 0.1 T and 2.0 T, dependently upon the optical disc, in comparison with the top pulse of the basic write strategy shown in FIG. 14B. In that case, the write power Pm of the intermediate bias portion 41 by the improved write strategy becomes smaller than the write power Pm of the intermediate bias portion 41 of the recording pulse waveform by the basic write strategy, too. Further, the write power Ph of the top pulse 40 and the last pulse 42 by the improved write strategy becomes smaller than the write power Ph of the top pulse 40 and the last pulse 42 of the recording pulse waveform by the basic write strategy, and can take the value between 1.1 times and 2.0 times of the write power Pm in the intermediate bias portion 41 by the improved write strategy. On the other hand, the recording pulse waveform by the improved write strategy shown in FIG. 14D indicates a state that the position of the last pulse 42 is shifted behind by 0.1 T to 2.0 T, in comparison with the example of the recording pulse waveform by the basic write strategy shown in FIG. 14B, and hence the detailed explanation thereof is omitted here.

In addition, according to the above-mentioned embodiment, the present invention is applied to the recording pulse signal including the last pulse 42. However, the present invention can also be applied to the recording pulse signal which does not include the last pulse 42.

As explained above, according to the improved write strategy of the present invention, in the recording pulse signal formed by the top pulse, the intermediate bias portion and the last pulse, the increase of the formed recording mark width can be suppressed without the distortion occurring to the reproducing signal waveform, by shifting the position of the top pulse ahead or by shifting the position of the last pulse behind. Therefore, it can be prevented that the LPPs on the land track neighboring the recording track are distorted and destroyed by the recording marks. Also, since the distortion does not occur to the reproducing signal waveform, jitter and an error of reading out of the recording mark can be prevented.

If the identical improvement is applied to the recording pulse waveform configured by the top pulse and the pulse train and the position of the top pulse is shifted ahead, the identical effect can be obtained, too.

INDUSTRIAL APPLICABILITY

The information recording apparatus and the information recording method according to the present invention can be utilized when information is recorded on an optical disc by using the laser light and the like.

The invention claimed is:

1. An information recording apparatus which irradiates a laser light on a recording medium and forms recording marks according to a recording signal, comprising:
   a driving source which rotationally drives the recording medium at least at a first rotation speed and a second rotation speed higher than the first rotation speed;
   a light source which emits the laser light;
   a signal generating unit which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and
   a control unit which irradiates a laser pulse on the recording medium by controlling the light source based on the recording pulse signal,
   wherein the second magnitude is smaller than the first magnitude, the intermediate bias portion is continuous in time to the top pulse, and the last pulse is continuous in time to the intermediate portion,
   wherein the signal generating unit shifts a position of the top pulse ahead of a position of the top pulse in a case that the recording medium is rotationally driven at the first rotation speed, when the recording medium is rotationally driven at the second rotation speed.

2. The information recording apparatus according to claim 1, wherein a shift quantity of the top pulse is a value between 0.1 T and 2.0 T.

3. The information recording apparatus according to claim 1, wherein the signal generating unit sets the first magnitude to a value between 1.1 times and 2.0 times of the second magnitude, when the recording medium is rotationally driven at the second rotation speed.

4. The information recording apparatus according to claim 1, wherein the signal generating unit increases a pulse width from a front end portion of the top pulse to a back end portion of the last pulse by shifting the position of the top pulse.

5. An information recording apparatus which irradiates a laser light on a recording medium and forms recording marks according to a recording signal, comprising:
   a driving source which rotationally drives the recording medium at least at a first rotation speed and a second rotation speed higher than the first rotation speed;
   a light source which emits the laser light;
   a signal generating unit which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and
   a control unit which irradiates a laser pulse on the recording medium by controlling the light source based on the recording pulse signal,
   wherein the second magnitude is smaller than the first magnitude, the intermediate bias portion is continuous in time to the top pulse, and the last pulse is continuous in time to the intermediate portion,
   wherein the signal generating unit shifts a position of the last pulse behind a position of the last pulse in a case that the recording medium is rotationally driven at the first rotation speed, when the recording medium is rotationally driven at the second rotation speed.

6. The information recording apparatus according to claim 5, wherein a shift quantity of the last pulse is a value between 0.1 T and 2.0 T.

7. The information recording apparatus according to claim 5, wherein the signal generating unit sets the first magnitude to a value between 1.1 times and 2.0 times of the second magnitude, when the recording medium is rotationally driven at the second rotation speed.

8. The information recording apparatus according to claim 5, wherein the signal generating unit increases a pulse width from a front end portion of the top pulse to a back end portion of the last pulse by shifting the position of the top pulse.

9. An information recording apparatus which irradiates a laser light on a recording medium and forms recording marks according to a recording signal, comprising:
   a driving source which rotationally drives the recording medium at least at a first rotation speed and a second rotation speed higher than the first rotation speed;
   a light source which emits the laser light;
   a signal generating unit which generates a recording pulse signal including a top pulse located at a front end portion and having a first magnitude, and a pulse train portion having one or a plurality of pulse following the top pulse, based on the recording signal; and
   a control unit which irradiates a laser pulse on the recording medium by controlling the light source based on the recording pulse signal,
   wherein the signal generating unit shifts a position of the top pulse ahead of a position of the top pulse in a case that the recording medium is rotationally driven at the first rotation speed, when the recording medium is rotationally driven at the second rotation speed.

10. The information recording apparatus according to claim 9, wherein a shift quantity of the top pulse is a value between 0.1 T and 1.5 T.

11. The information recording apparatus according to claim 9, wherein the signal generating unit sets a duty ratio of the pulse train portion to a value between 0.3 and 0.9, when the recording medium is rotationally driven at the second rotation speed.

12. An information recording method which irradiates a laser light from a light source on a recording medium and forms recording marks according to a recording signal, comprising:
   a driving process which rotationally drives the recording medium at least at a first rotation speed and a second rotation speed higher than the first rotation speed; a signal generating process which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and
   a control process which irradiates a laser pulse on the recording medium by controlling the light source based on the recording pulse signal,
   wherein the second magnitude is smaller than the first magnitude, the intermediate bias portion is continuous in time to the top pulse, and the last pulse is continuous in time to the intermediate portion,
   wherein the signal generating process shifts a position of the top pulse ahead of a position of the top pulse in a case that the recording medium is rotationally driven at the first rotation speed, when the recording medium is rotationally driven at the second rotation speed.

13. The information recording method according to claim 12, wherein the signal generating process increases a to a value between 1.1 times and 2.0 times of the second magnitude, when the recording medium is rotationally driven at the second rotation speed.

14. An information recording method which irradiates a laser light from a light source on a recording medium and forms recording marks according to a recording signal, comprising:
- a driving process which rotationally drives the recording medium at least at a first rotation speed and a second rotation speed higher than the first rotation speed;
- a signal generating process which generates a recording pulse signal including a top pulse located at a front end portion and having a first magnitude, a last pulse located at a back end portion and having the first magnitude, and an intermediate bias portion located between the top pulse and the last pulse and having a second magnitude, based on the recording signal; and
- a control process which irradiates a laser pulse on the recording medium by controlling the light source based on the recording pulse signal,
- wherein the second magnitude is smaller than the first magnitude, the intermediate bias portion is continuous in time to the top pulse, and the last pulse is continuous in time to the intermediate portion,
- wherein the signal generating process shifts a position of the last pulse behind a position of the last pulse in a case that the recording medium is rotationally driven at the first rotation speed, when the recording medium is rotationally driven at the second rotation speed.

15. The information recording method according to claim 14, wherein the signal generating process increases a pulse width from a front end portion of the top pulse to a back end portion of the last pulse by shifting the position of the top pulse.

16. An information recording method which irradiates a laser light from a light source on a recording medium and forms recording marks according to a recording signal, comprising:
- a driving process which rotationally drives the recording medium at least at a first rotation speed and a second rotation speed higher than the first rotation speed;
- a signal generating process which generates a recording pulse signal including a top pulse located at a front end portion and having a first magnitude and, and a pulse train portion having one or a plurality of pulse following the top pulse, based on the recording signal; and
- a control process which irradiates a laser pulse on the recording medium by controlling the light source based on the recording pulse signal,
- wherein the signal generating process shifts a position of the top pulse ahead of a position of the top pulse in a case that the recording medium is rotationally driven at the first rotation speed, when the recording medium is rotationally driven at the second rotation speed.

* * * * *